United States Patent
Lee et al.

(10) Patent No.: US 11,476,513 B2
(45) Date of Patent: Oct. 18, 2022

(54) HEAT DISSIPATING ELASTIC BODY COMPOSITION AND HEAT DISSIPATING ELASTIC BODY REALIZED THEREFROM

(71) Applicant: AMOGREENTECH CO., LTD., Gimpo-si (KR)

(72) Inventors: Hwan Ku Lee, Suwon-si (KR); Seung Jae Hwang, Incheon (KR); Beom Jun Kim, Seongnam-si (KR); Moon Young Hwang, Incheon (KR)

(73) Assignee: AMOGREENTECH CO., LTD., Gimpo-si (KR)

( * ) Notice: Subject to any disclaimer, the term of this patent is extended or adjusted under 35 U.S.C. 154(b) by 489 days.

(21) Appl. No.: 16/464,070

(22) PCT Filed: Nov. 28, 2017

(86) PCT No.: PCT/KR2017/013691
§ 371 (c)(1),
(2) Date: May 24, 2019

(87) PCT Pub. No.: WO2018/097697
PCT Pub. Date: May 31, 2018

(65) Prior Publication Data
US 2019/0386360 A1 Dec. 19, 2019

(30) Foreign Application Priority Data
Nov. 28, 2016 (KR) .......................... 10-2016-0159114

(51) Int. Cl.
*H01M 10/6551* (2014.01)
*C09K 5/14* (2006.01)
(Continued)

(52) U.S. Cl.
CPC .......... *H01M 10/6551* (2015.04); *B29B 7/90* (2013.01); *C08G 77/20* (2013.01); *C08J 3/203* (2013.01);
(Continued)

(58) Field of Classification Search
None
See application file for complete search history.

(56) References Cited

U.S. PATENT DOCUMENTS 2,671,069 A * 3/1954 Savage .................... C08K 3/22
524/430
3,054,769 A * 9/1962 Pike ........................ C08L 83/04
523/210
(Continued)

FOREIGN PATENT DOCUMENTS

JP  2008031358 A  2/2008
KR  20040031602 A  4/2004
(Continued)

OTHER PUBLICATIONS

Machine translation of KR 10-0712079, Lee et al., 2007 (Year: 2007).*

*Primary Examiner* — Tae H Yoon
(74) *Attorney, Agent, or Firm* — Rothwell, Figg, Ernst & Manbeck, P.C.

(57) ABSTRACT

Provided is a heat-dissipating elastic body composition. The heat-dissipating elastic body composition according to an exemplary embodiment of the present invention includes an elastic matrix-forming component including a base resin and a vulcanizing agent, and a heat-dissipating filler. Accordingly, the heat-dissipating elastic body may protect a heating element from a physical stimulus such as a vibration or impact transmitted from the outside to a heat dissipater, and rapidly transduce and radiate heat generated in the heating element. In addition, the heat-dissipating elastic body may (Continued)

minimize vibrations caused by a physical stimulus applied from the outside and a noise thereby by minimizing a gap between a heating element and an exterior material, a heat dissipating element or the like, which is adjacent thereto/in close contact therewith. Further, the heat-dissipating elastic body heating element may minimize deterioration by heat generated by a heating element or an external chemical stimulus and may be easily implemented in various shapes, and therefore, it may be widely applied to all industries requiring heat dissipation.

18 Claims, 12 Drawing Sheets

(51) Int. Cl.
| | |
|---|---|
| *C08G 77/20* | (2006.01) |
| *C08K 3/36* | (2006.01) |
| *C08K 3/22* | (2006.01) |
| *C08J 3/20* | (2006.01) |
| *H01M 10/613* | (2014.01) |
| *B29B 7/90* | (2006.01) |
| *B29K 83/00* | (2006.01) |
| *B29K 509/02* | (2006.01) |

(52) U.S. Cl.
CPC ............. *C08K 3/22* (2013.01); *C08K 3/36* (2013.01); *C09K 5/14* (2013.01); *H01M 10/613* (2015.04); *B29K 2083/00* (2013.01); *B29K 2509/02* (2013.01); *B29K 2995/0046* (2013.01); *C08K 2003/2227* (2013.01); *C08K 2201/001* (2013.01)

(56) References Cited

U.S. PATENT DOCUMENTS

| | | | | |
|---|---|---|---|---|
| 3,549,744 | A | * 12/1970 | Compton | ............... C08K 5/11 106/38.22 |
| 4,588,768 | A | * 5/1986 | Streusand | ............... C08K 3/34 524/588 |
| 6,054,520 | A | 4/2000 | Washio et al. | |
| 7,479,532 | B2 | * 1/2009 | Tonge | ................... C08L 83/04 528/31 |
| 2004/0067372 | A1 | 4/2004 | Takei et al. | |
| 2007/0117920 | A1 | * 5/2007 | Hirabayashi | ........... C08L 83/04 524/588 |
| 2014/0349067 | A1 | 11/2014 | Usui et al. | |

FOREIGN PATENT DOCUMENTS

| | | |
|---|---|---|
| KR | 10-0712079 | 5/2007 |
| KR | 20100047907 A | 5/2010 |
| KR | 20160016517 A | 2/2016 |
| KR | 20160134124 A | 11/2016 |

\* cited by examiner

[Fig. 12]
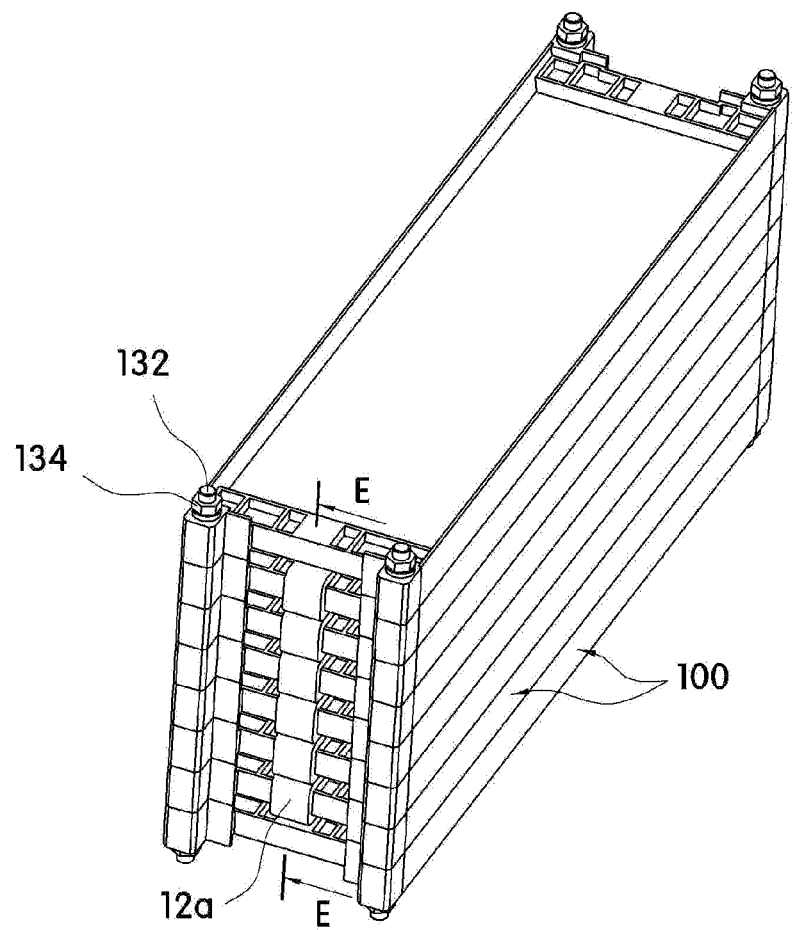

[Fig. 13]
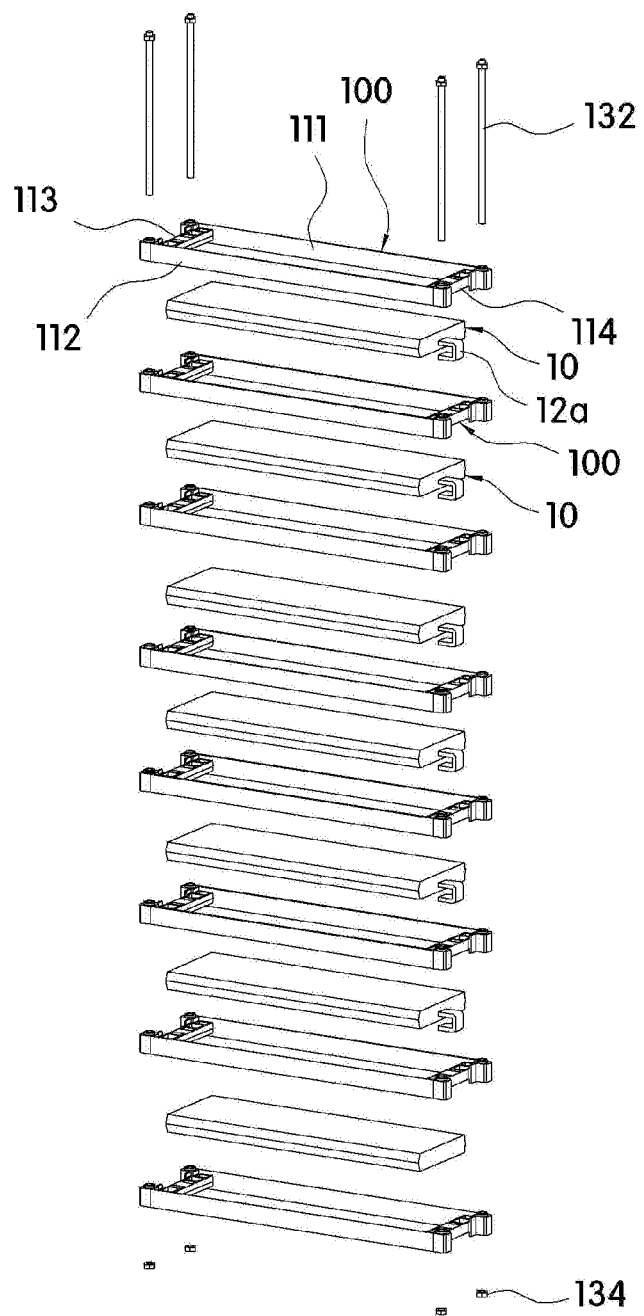

[Fig. 14]
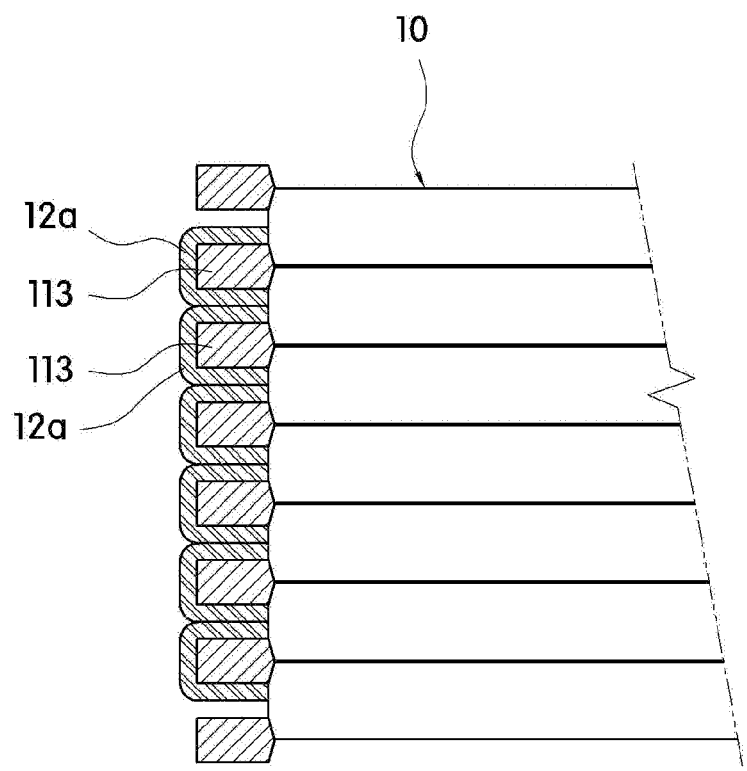

HEAT DISSIPATING ELASTIC BODY COMPOSITION AND HEAT DISSIPATING ELASTIC BODY REALIZED THEREFROM

CROSS REFERENCE TO RELATED APPLICATION

This application is a 35 U.S.C. 371 National Phase Entry Application from PCT/KR2017/013691, filed Nov. 28, 2017, which claims the benefit of Korean Patent Application No. 10-2016-0159114 filed on Nov. 28, 2016, the disclosures of which are incorporated herein in their entirety by reference.

TECHNICAL FIELD

The present invention relates to a heat-dissipating elastic body composition, and more preferably, to a heat-dissipating elastic body composition which minimizes an influence of a physical stimulus such as a vibration transmitted from the outside through an exterior material or a heat dissipater such as a heat sink, which is disposed in close contact with a heating element, on the heating element, is capable of effectively emitting heat of the heating element to the outside and having excellent thermal resistance and chemical resistance, and a heat-dissipating elastic body implemented using the same.

BACKGROUND ART

Recently, as various electronic parts used in electronic devices tend to be minimized and complicated, there is a problem that the functions are easily degraded or lost even by an external stimulus. Particularly, when there is a part causing a vibration or impact applied from the outside during the use of an electronic device or causing a vibration as an electronic part thereof, the durability of various parts may be more problematic.

Meanwhile, various parts of an electronic device have a problem of heat generated by electrical resistance or electromagnetic waves, and to rapidly radiate the generated heat to the outside, a heat dissipating element may be disposed adjacent to a heating element, or a heat dissipation function is provided to a part having a different function, which is adjacent to a heating element. Alternatively, when heat generation is severe, it is common to provide a separate cooling part or device. To rapidly radiate heat of the heating element, as a heat dissipating element such as a heat dissipating plate or heat sink, generally, a metal with high thermal conductivity is used.

However, since the material of the metal is rigid and hard, the metal is not able to absorb a physical stimulus such as a vibration or impact, applied from the outside, and therefore, the physical stimulus applied to the heat dissipating element is directly transferred to the heat element adjacent thereto or in close contact therewith, resulting in damage or functional degradation to the heating element, and when the heating element is a small and complicated product such as an electronic part, the above-mentioned problem may be more serious.

In addition, when the heating element and the heat dissipating element are not completely in close contact with each other and have a gap therebetween, shaking caused by a vibration may more seriously damage the heating element.

Accordingly, even by a physical stimulus such as a vibration or impact transmitted from a heat dissipating element, an external case or a different type of part, which is adjacent to or in close contact with the heating element, the development of a heat-dissipating elastic body capable of protecting the heating element and more effectively radiating heat generated in the heating element to the outside is urgent.

DISCLOSURE

Technical Problem

To solve the above-described problems, the present invention is directed to providing a heat-dissipating elastic body composition capable of protecting a heat element from a physical stimulus such as a variation or impact transmitted from the outside, and rapidly conducting and radiating heat generated in the heat element, and a heat-dissipating elastic body implemented using the same.

The present invention is also directed to providing a heat-dissipating elastic body composition which can minimize vibrations caused by a physical stimulus applied from the outside and a noise thereby by minimizing a gap between a heating element and an exterior material, a heat dissipating element or the like, which is adjacent thereto in close contact therewith, and a heat-dissipating elastic body implemented thereby.

Further, the present invention is also directed to providing a heat-dissipating elastic body composition which can minimize deterioration by heat generated by a heating element or external chemical stimulation, and a heat-dissipating elastic body implemented thereby.

Moreover, the present invention is also directed to providing a heat-dissipating elastic body composition which can be easily implemented in various shapes due to excellent moldability and a heat-dissipating elastic body implemented thereby.

Technical Solution

To attain the above-described objects, the present invention provides a heat-dissipating elastic body composition, which includes 140 to 320 parts by weight of a heat-dissipating filler with respect to 100 parts by weight of an elastic matrix-forming component including a base resin containing a rubber-based compound and a vulcanizing agent.

According to an exemplary embodiment of the present invention, the base resin may include one or more selected from the group consisting of raw silicone rubber, ethylene propylene diene monomer (EPDM) rubber, thermoplastic polyolefin-based synthetic rubber (thermoplastic olefinic (TPO) elastomer), acrylate rubber, ethylene vinyl acetate (EVA) rubber, thermoplastic polyurethane rubber, ethylene octene rubber, chlorinated polyethylene rubber (CPE), nitrile rubber (nitrile butadiene rubber (NBR) and acrylonitrile butadiene rubber), chloroprene rubber (CR), thermoplastic polyethylene rubber, a thermoplastic styrenic block copolymer (SBC), thermoplastic polyamide rubber (TPAE) and a thermoplastic polyester elastomer (TPEE).

In addition, the base resin may be one or more types of raw silicone rubber selected from the group consisting of dimethyl silicone gum, methylphenyl silicone gum, fluorine silicone gum, hydroxyl dimethyl silicone gum and methyl vinyl silicone gum. Here, the raw silicone rubber may have a weight average molecular weight of 50,000 to 60,000.

In addition, the vulcanizing agent may include any one or more of a sulfur-based vulcanizing agent, an organic peroxide and a metal oxide, and may be included at 0.1 to 5 parts by weight with respect to 100 parts by weight of the base resin.

In addition, the heat-dissipating filler may include any one or more of an electrically non-conductive heat-dissipating filler including one or more selected from the group consisting of magnesium oxide, magnesium hydroxide, titanium dioxide, aluminum nitride, silicon nitride, boron nitride, aluminum oxide, aluminum hydroxide, silica, zinc oxide, barium titanate, strontium titanate, beryllium oxide, silicon carbide and manganese oxide; and an electrically conductive heat-dissipating filler including one or more selected from the group consisting of graphite, carbon nanotubes, graphene, carbon black, electrically conductive carbon, silver, copper, nickel, tin, aluminum, zinc, iron, gold and platinum.

In addition, the heat-dissipating filler may include a first heat-dissipating filler having an average particle size of 1 to 10 μm and a second heat-dissipating filler having an average particle size of more than 10 μm to 50 μm, and the second heat-dissipating filler may be included at 150 to 500 parts by weight with respect to 100 parts by weight of the first heat-dissipating filler.

In addition, the heat-dissipating fillers may be formed in any one or more shapes of plate-like, spherical, acicular, dendritic and irregular shapes.

In addition, one or more filling-reinforcing agents selected from the group consisting of fumed silica, precipitated silica, quartz, Celite and calcium carbonate may further be included at 20 to 40 parts by weight with respect to 100 parts by weight of the base resin.

In addition, a physical property-enhancing component for improving the plasticity and dispersity of a heat-dissipating filler may be further included at 3 to 10 parts by weight with respect to 100 parts by weight of the base resin, and the physical property-enhancing component may include one or more selected from the group consisting of methyl vinyl silicone having a hydroxyl group, dimethyl silicone, dimethyl silicone having an alkoxy group, and dimethyl silicone having an amino group.

In addition, the composition may have a viscosity of 7,000,000 to 10,000,000 cPs at 25° C.

In addition, the present invention provides a method of manufacturing a heat-dissipating elastic body, which includes: (1) preparing a heat-dissipating elastic body composition including a base resin, a vulcanizing agent and a heat-dissipating filler; and (2) molding the heat-dissipating elastic body composition into a predetermined shape by applying heat and pressure to form a heat-dissipating elastic body.

According to an exemplary embodiment of the present invention, the step (1) may be performed by 1-1) preparing a pre-foam composition by kneading a filling-reinforcing agent and a physical property-enhancing component with a base resin; 1-2) performing kneading by adding a heat-dissipating filler to the pre-foam composition; and 1-3) preparing a heat-dissipating elastic body composition by adding and kneading a vulcanizing agent.

In addition, the step (2) may be performed under conditions of a temperature of 150 to 250° C. and a pressure of 30 to 80 kgf/cm$^2$ for 3 to 30 minutes.

In addition, after the step (2), to eliminate an unreacted vulcanizing agent, the composition may be retreated with 200 to 300° C. heat for 1 to 4 hours.

In addition, the present invention provides a heat-dissipating elastic body formed by molding the heat-dissipating elastic body composition according to the present invention.

According to an exemplary embodiment of the present invention, the heat-dissipating elastic body may have a thermal conductivity of 0.5 to 3.0 W/m·K.

In addition, the heat-dissipating elastic body may have a tensile strength of 35 to 65 kgf/cm$^2$, an elongation rate of 65 to 180%, and a hardness (Shore A) of 45 to 75.

In addition, the present invention provides a heat-dissipating cartridge for a battery pack, which includes the heat-dissipating elastic body according to the present invention.

In addition, the present invention provides a cartridge for a battery pack, which supports the edge of a battery to configure a battery pack, and includes a main body including a pair of first and second guide elements spaced apart from each other to face each other and a pair of third and fourth guide elements spaced apart from each other to face each other between the first and second guide elements, such that a terminal of the battery is fixed thereto and a space for accommodating the battery is formed; and an elastic element consisting of a material with thermal conductivity and electric insulation and detachably connected to at least one of the first and second guide elements.

According to an exemplary embodiment of the present invention, at least one inner surface of the first and second guide elements may have an accommodating groove inwardly formed along a longitudinal direction, and the elastic element may be insert-fitted into the accommodating groove.

In addition, the accommodating groove may include a pair of side walls facing each other, and the pair of side walls may be formed to be inclined at a predetermined angle opposite directions relative to the bottom surface of the accommodating groove. Here, the side walls of the elastic element may be formed in a stepped surface into which an end of the side wall may be inserted.

As an exemplary embodiment, the elastic element may consist of a polymer resin including a thermal conductive filler, and more preferably, is molded using the elastic body composition according to the present invention.

In addition, the first, second, third and fourth guide elements may be formed as an inclined surface with an inclination such that the inner surface can support the edge of the battery, and the inclined surface may be inclined in opposite directions from the width center to both ends such that the central region of the inner surface protrudes.

In addition, the third and fourth guide elements may be provided with a connecting hole for coupling with another cartridge for a battery pack laminated together, and the both sides of the connecting hole may have a protruding portion and a receiving portion corresponding thereto, respectively, in a direction parallel to the direction of coupling the cartridges for a battery pack together.

In addition, in the connecting hole, a through hole is formed in a direction parallel to the connecting direction between the cartridges for a battery pack, and a plurality of the laminated cartridges for a battery pack may be integrated using one fastening bar inserted into the through hole.

In addition, the third and fourth guide elements may consist of an insulator.

In addition, the first, second, third and fourth guide elements may be integrated through insert molding.

As another example, the second, third and fourth guide elements are integrated through insert molding, and the first guide element may consist of a metallic material, and be detachably connected to ends of the third and fourth guide elements by means of a fixing element.

In addition, the first and second guide elements may be detachably connected to both ends thereof, respectively, by means of a fixing element.

In addition, the first and second guide elements may consist of a metallic material, and the elastic element may be disposed in each of the first and second guide elements.

In addition, the second guide element may have a plurality of heat-dissipating grooves inwardly formed along a longitudinal direction in the outer surface thereof.

In addition, the outer surface of the first guide element may be processed by polishing.

In addition, a groove may be inwardly formed in at least one of the upper surface and the lower surface of the third and fourth guide elements.

In addition, the present invention provides a battery pack, which includes a heat-dissipating cartridge for a battery pack according to the present invention and a battery accommodated in the heat-dissipating cartridge for a battery pack.

Advantageous Effects

A heat-dissipating elastic body implemented using a heat-dissipating elastic body composition of the present invention can protect a heating element from a physical stimulus such as a vibration or impact transmitted from the outside to a heat dissipater, and rapidly transduce and radiate heat generated in the heating element. In addition, the heat-dissipating elastic body can minimize vibration caused by a physical stimulus applied from the outside and a noise thereby by minimizing a gap between a heating element and an exterior material, a heat dissipating element or the like, which is adjacent thereto/in close contact therewith. Further, the heat-dissipating elastic body heating element can minimize deterioration by heat generated by a heating element or an external chemical stimulus and can be easily implemented in various shapes, and therefore, it can be widely applied to all industries requiring heat dissipation.

DESCRIPTION OF DRAWINGS

FIG. 12 is a diagram of a battery pack configured using the heat-dissipating cartridges for a battery pack according to the present invention.

FIG. 13 is an exploded diagram of FIG. 12.

FIG. 14 is a cross-sectional view along the E-E direction in FIG. 12.

MODES OF THE INVENTION

Figure 1:
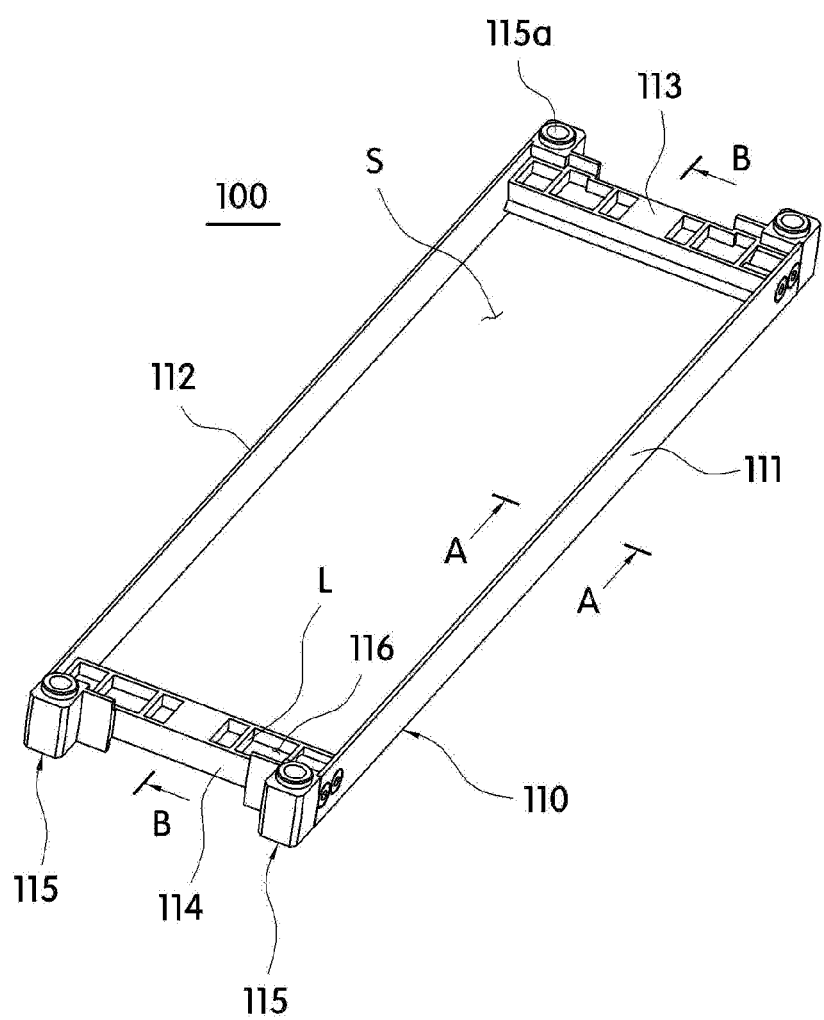
FIG. 1 is a diagram illustrating a heat-dissipating cartridge for a battery pack according to an exemplary embodiment of the present invention.

Hereinafter, embodiments of the present invention will be described in detail with reference to the accompanying drawings so that those of ordinary skill in the art can easily carry out the present invention. However, the present invention may be implemented in a variety of different forms, and is not limited to the embodiments described herein. In addition, for clear explanation of the present invention in the drawings, parts that are not related to the description are omitted, and like numerals denote like parts throughout the specification.

A heat-dissipating elastic body composition according to an exemplary embodiment of the present invention includes 140 to 320 parts by weight of a heat-dissipating filler with respect to 100 parts by weight of an elastic matrix-forming component including a base resin containing a rubber-based compound and a vulcanizing agent.

The base resin is a base material forming an elastic matrix formed by solidifying the composition, and any compound that has no problem in dispersibility of a heat-dissipating filler to be described below, and is able to manifest elasticity as it is or by a chemical reaction can be used without limitation. However, in order for the prepared elastic matrix to manifest elasticity, shape retention and thermal resistance, and to facilitate moldability, a rubber-based polymer compound is used.

As an example, the base resin may include one or more selected from the group consisting of raw silicone rubber, ethylene propylene diene monomer (EPDM) rubber, thermoplastic polyolefin-based synthetic rubber (thermoplastic olefinic (TPO) elastomer), acrylate rubber, ethylene vinyl acetate (EVA) rubber, thermoplastic polyurethane rubber, ethylene octene rubber, chlorinated polyethylene rubber (CPE), nitrile rubber (nitrile butadiene rubber (NBR) and acrylonitrile butadiene rubber), chloroprene rubber (CR), thermoplastic polyethylene rubber, a thermoplastic styrenic block copolymer (SBC), thermoplastic polyamide rubber (TPAE) and a thermoplastic polyester elastomer (TPEE).

The base resin is more preferably raw silicone rubber in terms of thermal resistance and workability, even more preferably, one or more types of raw silicone rubber selected from the group consisting of dimethyl silicone gum, methylphenyl silicone gum, fluorine silicone gum, hydroxyl dimethyl silicone gum and methyl vinyl silicone gum. Here, the silicone rubber preferably has a weight average molecular weight of 500,000 to 600,000. When the silicone rubber has a weight average molecular weight of less than 500,000, physical properties, such as thermal resistance and shape retention, of the implemented elastic matrix may be degraded, and when the silicone rubber has a weight average molecular weight of more than 600,000, elasticity may be degraded.

Next, the vulcanizing agent serves to crosslink a base resin, and thus an elastic matrix implemented even with a base resin without elasticity and having plasticity before crosslinking may exhibit elasticity, increased thermal resistance, and decreased compression permanent deformation. The vulcanizing agent may be any known component without limitation, and as an unlimited example of the vulcanizing agent, a metal oxide such as a sulfur-based vulcanizing agent, an organic peroxide, a resin vulcanizing agent or magnesium oxide may be used. The sulfur-based vulcanizing agent may be an inorganic vulcanizing agent such as powdered sulfur (S), insoluble sulfur (S), precipitated sulfur (S), or colloidal sulfur, or an inorganic vulcanizing agent such as tetramethylthiuram disulfide (TMTD), agent may be, specifically, a vulcanizing agent forming elemental sulfur or sulfur, for example, amine disulfide or polymeric sulfur. In addition, the organic peroxide may be any one selected from the group consisting of benzoyl peroxide, dicumyl peroxide, di-t-butyl peroxide, t-butylcumyl peroxide, methylethylketone peroxide, cumene hydroperoxide, 2,5-dimethyl-2,5-di(t-butylperoxy)hexane, 2,5-dimethyl-2,5-di(benzoylperoxy)hexane, 1,3-bis(t-butylperoxypropyl)benzene, di-t-butylperoxy-diisopropylbenzene, t-butylperoxybenzene, 2,4-dichlorobenzoyl peroxide, 1,1-dibutylperoxy-3,3,5-trimethylsiloxane, n-butyl-4,4-di-t-butylperoxyvalerate, and a combination thereof.

When the vulcanizing agent is contained at 0.1 to 5 parts by weight with respect to 100 parts by weight of the elastic resin, a desired level of elasticity is exhibited, which is preferable in terms of thermal resistance and chemical stability. When the vulcanizing agent is contained at less than 0.1 part by weight, desired levels of elasticity, thermal resistance and shape retention may not be exhibited, and when the vulcanizing agent is contained at more than 5 parts by weight, the removal of the vulcanizing agent may be difficult even by re-thermal treatment on a molded body according to a preparation method to be described below, and the molded body may be deformed due to long-term thermal treatment for removing the vulcanizing agent. As an unremoved vulcanizing agent is slowly eluted to the surface of the molded body, the molded body looks white, and detached as powder, and thus an electronic part on which a heat-dissipating elastic body is mounted may be contaminated.

The elastic matrix-forming component may further include an additive for improving thermal resistance, mechanical strength, dispersity of the heat-dissipating filler and/or adhesion as well as the above-described base resin and vulcanizing agent.

As an example of the additive, a physical property-improving component may be further included to improve plasticity and the dispersity of the heat-dissipating filler, increase a speed at which the heat-dissipating filler permeates into the base resin, and prevent the degradation of storage stability through crepe hardening of the base resin. The physical property-enhancing component may include one or more selected from the group consisting of methyl vinyl silicone having a hydroxyl group, dimethyl silicone, dimethyl silicone having an alkoxy group, and dimethyl silicone having an amino group. Here, preferably, in terms of the improved uniformity of a heat dissipation property due to the improvement of plasticity and the dispersity of the heat-dissipating filler, the additive is methyl vinyl silicone in which hydroxyl groups are present at both ends, and more preferably, methyl vinyl silicone having a polymerization degree of 15 to 25.

In addition, the physical property-enhancing component may be included at 3 to 10 parts by weight with respect to 100 parts by weight of the base resin. When the physical property-enhancing component is contained at less than 3 parts by weight, the improvement of elasticity of the elastic matrix may be insignificant, and the dispersity of the heat-dissipating filler may be degraded. Therefore, as the heat-dissipating filler is agglomerated and scattered, a uniform heat-dissipating effect may not be exhibited. In addition, when the physical property-enhancing component is contained at more than 10 parts by weight, the improvement in effects caused by the physical property-enhancing component may be insignificant, and the shape deformed by an external impact may not be restored due to decreased elasticity.

In addition, as an additive, a vulcanization accelerator may be further included. The vulcanization accelerator serves to promote a vulcanizing speed, or a delay action in an early vulcanization step.

The vulcanization accelerator may be any one selected from the group consisting of a sulfenamide-based accelerator, a thiazol-based accelerator, a thiuram-based accelerator, a thiourea-based accelerator, a guanine-based accelerator, a dithiocarbamic acid-based accelerator, an aldehyde-amine-based accelerator, an aldehyde-ammonia-based accelerator, an imidazoline-based accelerator, a xanthate-based accelerator and a combination thereof. The sulfenamide-based vulcanization accelerator may be any one sulfenamide-based compound selected from the group consisting of N-cyclohexyl-2-benzothiazyl sulfenamide (CBS), N-tert-butyl-2-benzothiazyl sulfenamide (TBBS), N,N-dicyclohexyl-2-benzothiazyl sulfenamide, N-oxydiethylene-2-benzothiazyl sulfenamide, N,N-diisopropyl-2-benzothiazole sulfenamide and a combination thereof.

In addition, an example of the thiazole-based vulcanization accelerator may be any one thiazole-based compound selected from the group consisting of 2-mercaptobenzothiazole (MBT), dibenzothiazyldisulfide (MBTS), a sodium salt of 2-mercaptobenzothiazole, a zinc salt of 2-mercaptobenzothiazole, a copper salt of 2-mercaptobenzothiazole, a cyclohexyl amine salt of 2-mercaptobenzothiazole, 2-(2,4-dinitrophenyl)mercaptobenzothiazole, 2-(2,6-diethyl-4-morpholinothio)benzothiazole and a combination thereof.

In addition, an example of the thiuram-based vulcanization accelerator may be any one thiuram-based compound selected from the group consisting of tetramethylthiuramdisulfide (TMTD), tetraethylthiuramdisulfide, tetramethylthiurammonosulfide, dipentamethylenethiuramdisulfide, dipentamethylenethiurammonosulfide, dipentamethylenethiuramtetrasulfide, dipentamethylenethiuramhexasulfide, tetrabutylthiuramdisulfide, pentamethylenethiuramtetrasulfide and a combination thereof.

In addition, an example of the thiourea-based vulcanization accelerator may be any one thiourea-based compound selected from the group consisting of thiacarbamide, diethylthiourea, dibutylthiourea, trimethylthiourea, diorthotolylthiourea and a combination thereof.

In addition, an example of the guanine-based vulcanization accelerator may be any one guanine-based compound selected from the group consisting of diphenylguanine, diorthotolylguanine, triphenylguanine, orthotolylbiguanide, diphenylguaninephthalate and a combination thereof.

In addition, an example of the dithiocarbamic acid-based vulcanization accelerator may be any one dithiocarbamic acid-based compound selected from the group consisting of zinc ethylphenyldithiocarbamate, zinc butylphenyldithiocarbamate, sodium dimethyldithiocarbamate, zinc dimethyldithiocarbamate, zinc diethyldithiocarbamate, zinc dibutyldithiocarbamate, zinc diamyldithiocarbamate, zinc dipropyldithiocarbamate, a complex of zinc pentamethylenedithiocarbamate and piperidine, zinc hexadecylisopropyldithiocarbamate, zinc octadecylisopropyldithiocarbamate, zinc dibenzyl dithiocarbamate, sodium diethyldithiocarbamate, pioperidine pentamethylenedithiocarbamate, selenium dimethyldithiocarbamate, tellurium diethyldithiocarbamate, cadmium diamyldithiocarbamate and a combination thereof.

In addition, an example of the aldehyde-amine-based or aldehyde-ammonia-based vulcanization accelerator may be any one aldehyde-amine-based or aldehyde-ammonia-based compound selected from the group consisting of an acetaldehyde-aniline reaction product, a butylaldehyde-aniline condensation product, hexamethylenetetramine, an acetaldehyde-ammonia reaction product and a combination thereof.

In addition, an example of the imidazoline-based vulcanization accelerator may be an imidazoline-based compound such as 2-mercaptoimidazoline, and an example of the xanthate-based vulcanization accelerator may be a xanthate-based compound such as zinc dibutylxanthogenate.

The vulcanization accelerator may be contained at 0.5 to 4.0 parts by weight with respect to 100 parts by weight of the base resin in order to improve productivity by the acceleration of a vulcanizing speed and improve physical properties of an elastic body.

In addition, as an additive, an activator of a vulcanization accelerant may be further included. The vulcanization accelerant is a mixture used to complete the promoting effect in combination with the vulcanization accelerator, and may be any one selected from the group consisting of an inorganic vulcanization accelerant, an organic vulcanization accelerant and a combination thereof. The inorganic vulcanization accelerant may be any one selected from the group consisting of zinc oxide (ZnO), zinc carbonate, magnesium oxide (MgO), lead oxide, potassium hydroxide and a combination thereof. The organic vulcanization accelerant may be any one selected from the group consisting of stearic acid, zinc stearate, palmitic acid, linoleic acid, oleic acid, lauric acid, dibutyl ammonium oleate, a derivative thereof, and a combination thereof. The vulcanization accelerant may be contained at 0.5 to 5 parts by weight with respect to 100 parts by weight of the base resin. When the vulcanization accelerant is contained at less than 0.5 part by weight, the improvement in vulcanizing speed and productivity may be insignificant due to an insufficient vulcanization promoting effect. In addition, when the vulcanization accelerant is contained at more than 5 parts by weight, a scorch phenomenon may easily occur, and a physical property such as mechanical strength may be degraded.

In addition, as an additive, a filling-reinforcing agent may be further included. The filling-reinforcing agent serves to improve the mechanical strength of the formed elastic body, and any filling-reinforcing agent conventionally included to supplement the mechanical strength of an elastic body may be used without limitation. Preferably, the filling-reinforcing agent may be one or more selected from the group consisting of fumed silica, precipitated silica, quartz, Celite and calcium carbonate. Here, the filling-reinforcing agent may be contained at 20 to 40 parts by weight with respect to 100 parts by weight of the base resin. When the filling-reinforcing agent is contained at less than 20 parts by weight, it may be difficult to supplement the mechanical strength at a desired level, and when the filling-reinforcing agent is contained at more than 40 parts by weight, the content of the heat-dissipating filler may be relatively reduced, resulting in degraded heat dissipation performance.

The filling-reinforcing agent may have an average particle size of 5 to 20 nm, but the present invention is not limited thereto. In addition, the filling-reinforcing agent preferably has a specific surface area of 200 $m^2/g$ or more, and more preferably, 250 to 600 $m^2/g$. When the filling-reinforcing agent having a specific surface area of less than 200 $m^2/g$ is used, it may be difficult to achieve a desired physical property.

In addition, as an additive, a coupling agent may be further included. When the above-described filling-reinforcing agent is included as an additive, the coupling agent may improve the dispersity of the filling-reinforcing agent and compatibility with the base resin. The coupling agent may be any one suitably selected from known coupling agents according to a specific type of the used filling-reinforcing agent, and as an unlimited example, any one selected from the group consisting of a sulfide-based silane compound, a mercapto-based silane compound, a vinyl-based silane compound, an amino-based silane compound, a glycidoxy-based silane compound, a nitro-based silane compound, a chloro-based silane compound, a methacrylic-based silane compound and a combination thereof.

Specifically, the sulfide-based silane compound may be any one selected from the group consisting of bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl)tetrasulfide, bis(4-trimethoxysilylbutyl)tetrasulfide, bis(3-triethoxysilylpropyl)trisulfide, bis(2-triethoxysilylethyl)trisulfide, bis(4-triethoxysilylbutyl)trisulfide, bis(3-trimethoxysilylpropyl)trisulfide, bis(2-trimethoxysilylethyl)trisulfide, bis(4-trimethoxysilylbutyl)trisulfide, bis(3-triethoxysilylpropyl)disulfide, bis(2-triethoxysilylethyl)disulfide, bis(4-triethoxysilylbutyl)disulfide, bis(3-trimethoxysilylpropyl)disulfide, bis(2-trimethoxysilylethyl)disulfide, bis(4-trimethoxysilylbutyl)disulfide, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 2-trimethoxysilylethyl-N,N-dimethylthiocarbamoyltetrasulfide, 3-trimethoxysilylpropylbenzothiazolyltetrasulfide, 3-triethoxysilylpropylbenzothiazoltetrasulfide, 3-trimethoxysilylpropylmethacrylate monosulfide, and a combination thereof.

In addition, the mercapto silane compound may be any one selected from the group consisting of 3-mercaptopropyltrimethoxysilane, 3-mercaptopropyltriethoxysilane, 2-mercaptoethyltrimethoxysilane, 2-mercaptoethyltriethoxysilane and a combination thereof.

In addition, the vinyl-based silane compound may be any one selected from the group consisting of ethoxysilane, vinyltrimethoxysilane and a combination thereof.

In addition, the amino-based silane compound may be any one selected from the group consisting of 3-aminopropyltriethoxysilane, 3-aminopropyltrimethoxysilane, 3-(2-aminoethyl)aminopropyltriethoxysilane, 3-(2-aminoethyl)aminopropyltrimethoxysilane and a combination thereof.

In addition, the glycidoxy-based silane compound may be any one selected from the group consisting of γ-glycidoxypropyltriethoxysilane, γ-glycidoxypropyltrimethoxysilane, γ-glycidoxypropylmethyldiethoxysilane, γ-glycidoxypropylmethyldimethoxysilane, and a combination thereof.

In addition, the nitro-based silane compound may be any one selected from the group consisting of 3-nitropropyltrimethoxysilane, 3-nitropropyltriethoxysilane and a combination thereof.

In addition, the chloro-based silane compound may be any one selected from the group consisting of 3-chloropropyltrimethoxysilane, 3-chloropropyltriethoxysilane, 2-chloroethyltrimethoxysilane, 2-chloroethyltriethoxysilane and a combination thereof.

In addition, the methacrylic-based silane compound may be any one selected from the group consisting of γ-methacryloxypropyl trimethoxysilane, γ-methacryloxypropyl methyldimethoxysilane, γ-methacryloxypropyl dimethylmethoxysilane and a combination thereof.

The coupling agent may be contained at 1 to 20 parts by weight with respect to 100 parts by weight of the base resin. When the coupling agent is contained at less than 1 part by weight, due to a lack of the improved dispersity of the filling-reinforcing agent, the processability and mechanical strength of the elastic body may be degraded, and due to a low frictional force of the elastic body, it may easily slide when being provided in the application, and when the coupling agent is contained at more than 20 parts by weight, due to excessive interactions between a filling-reinforcing agent and the base resin, a physical property such as elasticity may be degraded.

In addition, as an additive, a softening agent may be further included. The softening agent provides plasticity to the base resin to facilitate processing, and serves to suitably degrade and adjust the hardness of the formed elastic matrix. The softening agent may be petroleum-based oil or vegetable oil, but the present invention is not limited thereto. As the petroleum-based oil, any one selected from the group consisting of paraffin-based oil, naphthene-based oil, aromatic oil and a combination thereof may be used. In addition, as the vegetable oil, any one selected from the group consisting of castor oil, cottonseed oil, linseed oil, canola oil, soybean oil, palm oil, coconut oil, peanut oil, pine oil, pine tar, tall oil, corn oil, rice bran oil, safflower oil, sesame oil, olive oil, sunflower oil, palm kernel oil, camellia oil, jojoba oil, macadamia nut oil, tung oil and a combination thereof may be used. The softening agent may be used at 5 to 100 parts by weight with respect to 100 parts by weight of the base resin, which is preferable for increasing the processability of raw rubber.

In addition, as an additive, a thermal resistance-improving agent may be further included. The thermal resistance-improving agent may be a metal organic acid salt including a metal oxide and a transition metal, but the present invention is not limited thereto. The thermal resistance-improving agent may prevent the deterioration of an elastic body due to the prevention of the oxidation of an organic group, and inhibit a brittle phenomenon according to the excessive crosslinking between base resins. To exhibit the above-described function at a desired level, the thermal resistance-improving agent may be included at 0.5 to 20 parts by weight with respect to 100 parts by weight of the base resin, but the present invention is not limited thereto.

The additive may further include a flame retardant, an antioxidant, a leveling agent, a pH adjuster and a vulcanization regression inhibitor, and as specific type and content of each additive may be selected from those known in the art, the present invention is not particularly limited thereto.

Hereinafter, a heat-dissipating filler will be described.

The heat-dissipating filler may be a known heat-dissipating filler having thermal conductivity, but the present invention is not limited thereto. As an example, the heat-dissipating filler may be any one or more of an electrically non-conductive heat-dissipating filler including one or more selected from the group consisting of magnesium oxide, magnesium hydroxide, titanium dioxide, aluminum nitride, silicon nitride, boron nitride, aluminum oxide, aluminum hydroxide, silica, zinc oxide, barium titanate, strontium titanate, beryllium oxide, silicon carbide and manganese oxide; and an electrically conductive heat-dissipating filler including one or more selected from the group consisting of graphite, carbon nanotubes, graphene, carbon black, electrically conductive carbon, silver, copper, nickel, tin, aluminum, zinc, iron, gold and platinum, but the present invention is not limited thereto. When a heat-dissipating filler consists of two or more of the materials described above, the heat-dissipating filler may be a heat-dissipating filler formed independently of each of the materials, or a single heat-dissipating filler formed of different materials are mixed or in a core-shell structure. The heat-dissipating filler having a core-shell structure may have a shell formed of silver or nickel and the outer surface of a core formed of a ceramic such as glass bead, aluminum, graphite or tin. A specific type of the heat-dissipating filler may be suitably selected in consideration of requirements of the application including the heat-dissipating elastic body, for example, highly reliable electric insulability and a heat dissipation level.

The heat-dissipating filler may be formed of powdered particles. The shape of the particle may be known, and for example, any one or more of plate-like, spherical, acicular, dendritic and irregular shapes. The shape of the heat-dissipating filler may be suitably selected in consideration of a desired physical property of a heat-dissipating elastic body, for example, vertical thermal conductivity or horizontal thermal conductivity, and more specifically, to improve horizontal thermal conductivity, a plate-like shape is preferable, and to improve vertical thermal conductivity, a spherical shape is preferable.

The heat-dissipating filler may have an average particle size of 1 to 100 μm, and preferably, 1 to 50 μm. In addition, as the heat-dissipating filler, two types of heat-dissipating fillers with different particle sizes may be included, and for example, a first heat-dissipating filler having an average particle size of 1 to 10 μm and a second heat-dissipating filler having an average particle size of more than 10 μm to 50 μm may be used together, and to this end, the above-described ranges of average particle sizes are preferable for exhibiting an improved heat-dissipating characteristic at a limited content of the heat-dissipating filler included in the heat-dissipating elastic body composition. Here, the heat-dissipating filler may include 150 to 500 parts by weight of a second heat-dissipating filler with respect to 100 parts by weight of the first heat-dissipating filler, and when the contents of the first heat-dissipating filler and the second heat-dissipating filler are outside the above-described ranges, the improvement in heat dissipation property, particularly, the uniformity of the heat dissipation property may be insignificant.

In addition, to improve the heat dissipating properties in horizontal and vertical directions, and exhibit uniform heat dissipating properties per position of the implemented heat dissipater, more preferably, a ratio of the average particle size of the first heat-dissipating filler to the average particle size of the second heat-dissipating filler may be 1:1.5 to 3.5, and even more preferably, 1:1.5 to 2.7. If it is not satisfied, the heat dissipation property and the uniformity of the heat dissipation performance may not be further improved.

The heat-dissipating filler may be included at 140 to 320 parts by weight with respect to 100 parts by weight of the base resin. When the heat-dissipating filler is included at less than 140 parts by weight, heat dissipation performance may not be exhibited at a desired level. In addition, when the heat-dissipating filler is included at more than 320 parts by weight, the hardness of the heat-dissipating elastic body may be increased, the tensile strength and the elongation rate thereof may be decreased, and therefore, it may be difficult to simultaneously exhibit a desired elastic property and desired mechanical strength.

In addition, the above-described heat-dissipating elastic body composition may have a viscosity of 7,000,000 to 10,000,000 cPs at 25° C., and therefore, moldability may be improved.

The above-described heat-dissipating elastic body composition may be manufactured by a method including: (1) preparing a heat-dissipating elastic body composition including a base resin, a vulcanizing agent and a heat-dissipating filler; and (2) molding the heat-dissipating elastic body composition into a predetermined shape by applying heat and a pressure, but the present invention is not limited thereto. First, as the step (1) according to the present invention, a heat-dissipating elastic body composition including a base resin, a vulcanizing agent and a heat-dissipating filler is prepared.

In the step (1), preferably, for kneading to improve the dispersity of the heat-dissipating filler, and completely achieve physical properties of an elastic matrix of a heat-dissipating elastic body formed in the step (2), which will be described below, at a desired level, the method may be performed by 1-1) preparing a pre-foam composition by kneading a filling-reinforcing agent and a physical property-enhancing component with a base resin; 1-2) performing kneading by adding a heat-dissipating filler to the pre-foam composition; and 1-3) preparing a heat-dissipating elastic body composition by adding and kneading a vulcanizing agent.

In the step (1), descriptions of the composition and composition ratio of the heat-dissipating elastic body composition are the same as that of the above-described heat-dissipating elastic body composition, and thus detailed descriptions will be omitted. The step 1-1) may be performed for 1 to 2 hours using a kneader, but the present invention is not limited thereto. In addition, the step 1-2) may also be performed using a kneader for 1 to 5 hours, but the present invention is not limited thereto.

Next, as the step (2), a step of molding the heat-dissipating elastic body composition into a predetermined shape by applying heat is performed.

The molding may be performed by a known molding method such as compression molding, extrusion molding, injection molding or blow molding, which may be suitably selected in consideration of the shape of a desired heat-dissipating elastic body. As an example, when the heat-dissipating elastic body has a continuous shape such as a wire or tube, extrusion molding may be suitable, and when the shape of the heat-dissipating elastic body is molded in a specific shape, compression molding or injection molding may be applied, but the present invention is not limited thereto.

In molding, a molding temperature and time may be changed depending on a molding method, the type of a vulcanizing agent, or a dimension of a desired elastic body, but the present invention is not particularly limited. For example, compression molding may be performed in a mold at 150 to 250° C. for 1 to 30 minutes, and preferably, at 150 to 180° C. for 3 to 10 minutes. In addition, at this time, a pressure may also be applied, for example, preferably, 10 to 100 kgf/cm$^2$, and more preferably, 30 to 80 kgf/cm$^2$. When the pressure is applied as well as heat, a uniform heat-dissipating elastic body may be prepared, and a gap between heat-dissipating fillers in the elastic body is smaller, resulting in further improvement of thermal conductivity performance.

According to an exemplary embodiment of the present invention, after the step (2), to eliminate an unreacted vulcanizing agent, a step of re-treating the heat-dissipating elastic body with 200 to 300° C. heat, more preferably, 200 to 250° C. heat, for 1 to 4 hours may be further performed. Here, the treated temperature is preferably set higher than the temperature of heat applied in molding of the step (2), and at least 10° C. higher heat is preferably applied to advantageously achieve the object of the present invention, for example, to facilitate the elimination of the unreacted vulcanizing agent.

The heat-dissipating elastic body prepared by the above-described preparation method includes an elastic matrix and a heat-dissipating filler dispersed in the elastic matrix. The heat-dissipating filler may be included at 140 to 320 parts by weight with respect to 100 parts by weight of the elastic matrix formed by vulcanizing an elastic matrix-forming component. In addition, the heat-dissipating elastic body may have a thermal conductivity of 0.5 to 3.0 W/m·K. In addition, the heat-dissipating elastic body may have a tensile strength of 20 to 60 kgf/cm$^2$ and an elongation rate of 65 to 180%. In addition, the heat-dissipating elastic body may have a hardness (Shore A) of 45 to 75, and therefore, there is an advantage of significantly attenuating a physical impact transmitted to a heating element without damage or deformation of a heat dissipater due to the physical impact applied from the outside, for example, a vibration, and an excellent heat dissipation property may be exhibited at the same time.

The heat-dissipating elastic body according to an exemplary embodiment of the present invention may be applied to various fields, for example, a heat-dissipating cartridge for a battery pack.

The heat-dissipating cartridge 100, 200 or 300 for a battery pack according to an exemplary embodiment of the present invention may include a main body 110, 210 or 310 and an elastic element 120, as shown in FIGS. 1 to 9.

The main body 110, 210 or 310 serves to independently support a plurality of batteries 10 when configuring a battery pack, and may consist of a ring-shaped frame structure having an accommodating space S for supporting the edge of the battery 10 and accommodating the battery 10.

Figure 6:
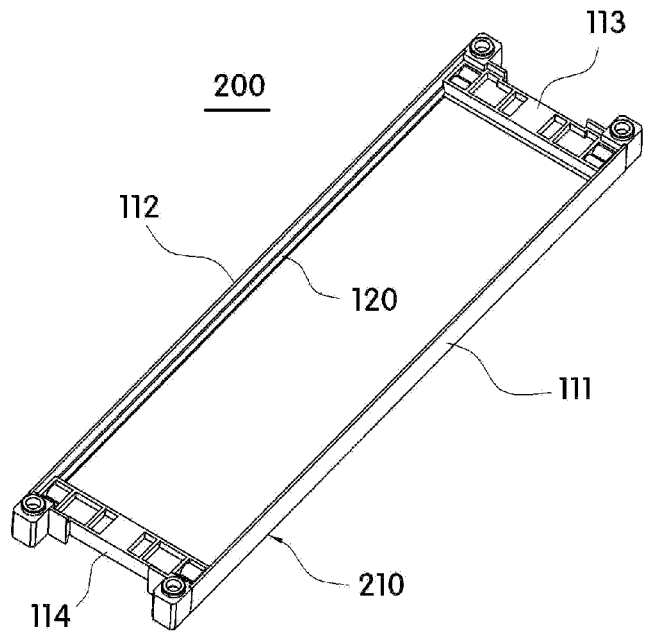
FIG. 6 is a diagram illustrating a heat-dissipating cartridge for a battery pack according to another exemplary embodiment of the present invention.
Figure 8:
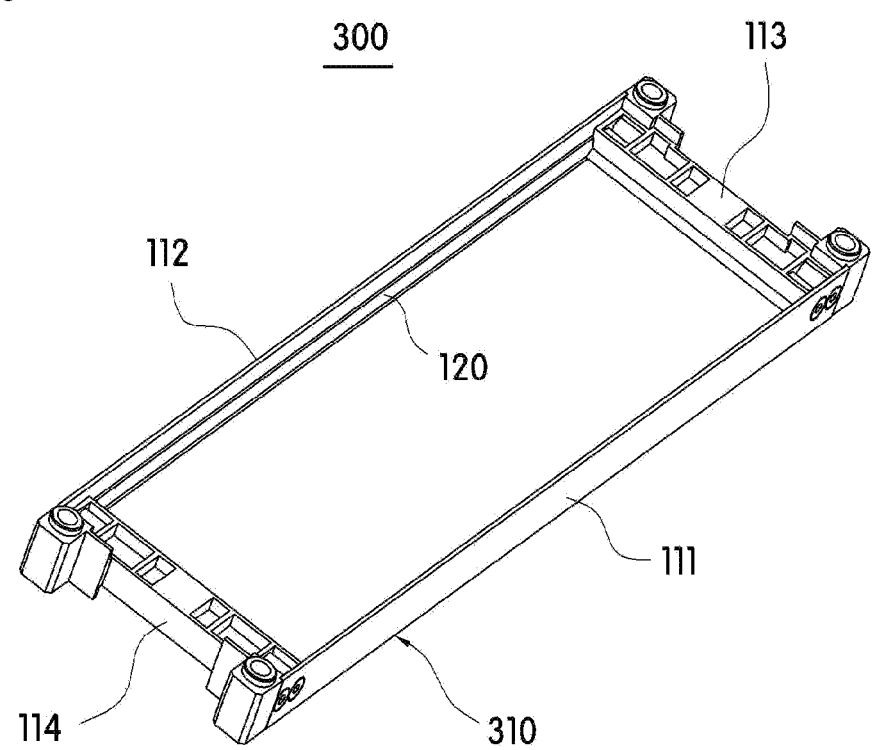
FIG. 8 is a diagram illustrating a heat-dissipating cartridge for a battery pack according to still another exemplary embodiment of the present invention.

Specifically, the main body 110, 210 or 310 may include a pair of first and second guide elements 111 and 112 spaced apart from each other to face each other and a pair of third and fourth guide elements 113 and 114 disposed therebetween and spaced apart from each other to face each other, and both ends of the first and second guide elements 111 and 112 may be connected to one end of each of the third and fourth guide elements 113 and 114, respectively (see FIGS. 1, 6 and 8).

Therefore, the main body 110, 210 or 310 is defined by the first, second, third and fourth guide elements 111, 112, 113 and 114, thereby forming an accommodating space S with open top and bottom, and the battery 10 may be disposed in the accommodating space S.

Figure 3:
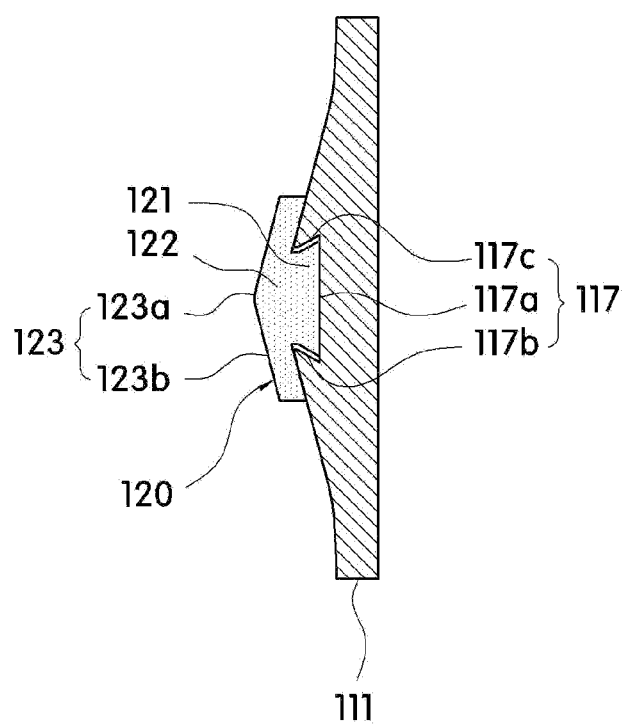
FIG. 3 is a cross-sectional view along the A-A direction in FIG. 1.
Figure 4:
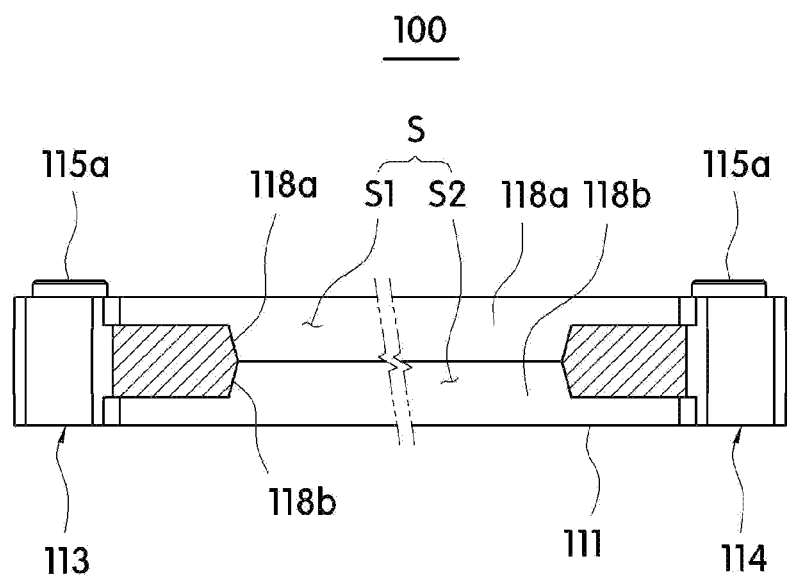
FIG. 4 is a cross-sectional view along the B-B direction in FIG. 1.

Here, the inner surface of the first, second, third or fourth guide element 111, 112, 113 or 114 may be formed to have inclined surfaces 118*a* and 118*b* with a predetermined inclination to support the edge of the battery 10, and the inclined surfaces 118*a* and 118*b* may include a first inclined surface 118*a* and a second inclined surface 118*b*, which have inclinations in opposite directions (see FIGS. 3 and 4).

As an example, the first inclined surface 118*a* and the second inclined surface 118*b* may be formed to protrude the central region toward the accommodating space S by forming the inclinations from the width center to both ends of the first, second, third or fourth guide element 111, 112, 113 or 114 in opposite directions.

Here, the inclined surface 118*a* or 118*b* may be a horizontal surface or a curved surface with a predetermined curvature, and the first inclined surface 118a and the second inclined surface 118b may have the same height.

That is, the accommodating space S may consist of a first accommodating space S1 defined by the first inclined surface 118a and a second accommodating space S2 defined by the second inclined surface 118b, and the first accommodating space S1 and the second accommodating space S2 may be formed to have the same volume.

Accordingly, when a battery pack is implemented by sequentially laminating a plurality of heat-dissipating cartridges 100, 200 and 300, the battery 10 disposed in the accommodating space S may be accommodated at a partial thickness (preferably, a half of the total thickness) of the total thickness in the second accommodating space S2 formed in one located below among the two laminated heat-dissipating cartridges 100, 200 or 300, and the rest of the battery 10 may be accommodated in the first accommodating space S1 formed in the other located above among the heat-dissipating cartridges 100, 200 or 300. In the same manner as described above, a plurality of batteries 10 may be accommodated between two adjacent heat-dissipating cartridges 100, 200 or 300.

Therefore, in the battery pack implemented with the heat-dissipating cartridges 100, 200 and 300, the heat-dissipating cartridges 100, 200 and 300 have substantially the same thickness, such that a large number of batteries can be installed in the same area, and the battery pack can be slimmer and have higher capacity.

Meanwhile, in the heat-dissipating cartridges 100, 200 and 300 for a battery pack according to the present invention, since at least any one of the plurality of guide elements 111, 112, 113 and 114 is formed of a metallic material, heat generated in the battery 10 may be effectively emitted.

Preferably, at least any one of the first guide element 111 and the second guide element 112 supporting the edge of the battery 10 in the longitudinal direction may consist of a metallic material, and the guide element consisting of a metallic material may be the first guide element 111 directly in contact with a cooling device such as a heat exchanger or a cooling chamber at the outer surface thereof. Here, the metal may be aluminum having excellent thermal conductivity and a low price, but the present invention is not limited thereto, and it is known that various types of metals may be used.

Accordingly, in the heat-dissipating cartridges 100, 200 and 300 for a battery pack according to the present invention, heat generated from the battery 10 may be transmitted to the first guide element 111 consisting of a metallic material and then transferred to the cooling device, thereby rapidly emitting the heat.

Here, the outer surface of the first guide element 111 may be processed to polishing to remove fine irregularities formed in the surface. Therefore, the heat emitting ability may be improved by increasing the close contact between the outer surface of the first guide element 111 and the cooling device.

Figure 11:
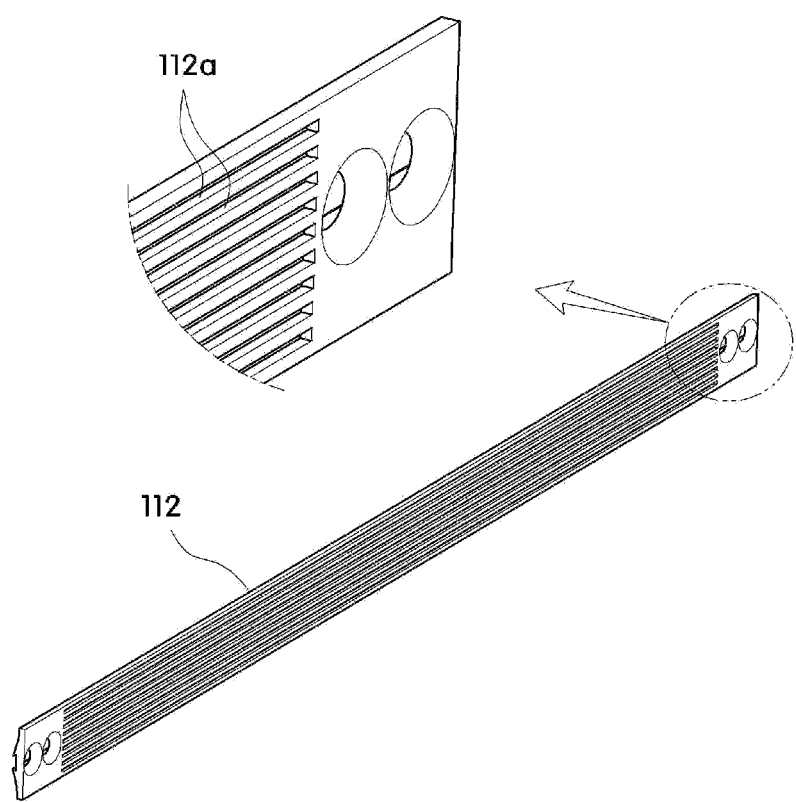
FIG. 11 is a diagram illustrating that a heat-dissipating groove is formed in the outer surface of a second guide element applied to the heat-dissipating cartridge for a battery pack according to the present invention.

Moreover, when the second guide element 112 also consists of a metallic material like the first guide element 111, since a plurality of heat dissipation grooves 112a may be inwardly formed along the longitudinal direction in the outer surface of the second guide element 112 to expand a contact area with the outside, the emitting efficiency of the heat transmitted to the second guide element 112 in the battery 10 may be increased (see FIG. 11).

Meanwhile, for heat dissipation performance, the first guide element consisting of a metallic material is in direct contact with the battery, and in this case, an external force such as an impact or vibration applied to the main body may cause battery damage. To prevent the damage, a heat-dissipating elastic body 120 may be disposed on the inner surface of the first guide element 111, and thus the battery damage caused by direct friction between metals may be fundamentally prevented by preventing the direct contact between the battery 10 disposed in the accommodating space S1 or S2 and the first guide element 111 consisting of a metallic material and a gap which may be formed between the battery and the first guide element 111. In addition, the heat generated from the battery 10 may be actively transferred to the first guide element 111 due to excellent heat dissipation performance of the heat-dissipating elastic body 120. Here, the elastic element 120 may be an elastic heat dissipater, and for example, a heat-dissipating filler may be dispersed in the elastic matrix. More preferably, the elastic element 120 may be a heat-dissipating elastic body molded through the above-described heat-dissipating elastic body composition, which is advantageous for significantly attenuating physical impact transmitted to a heating element without damage or deformation of the heat dissipater by a physical impact applied from the outside, for example, a vibration, and is able to manifest an excellent heat dissipating characteristic.

Moreover, when a battery pack is implemented by laminating a plurality of the heat-dissipating cartridges 100, 200 and 300, and the battery pack is disposed so that the outer surface of the first guide element 111 is in contact with the cooling device, a load such as a self-weight or a vibration, which may be transferred to the battery 10 disposed in an accommodating space S from the first guide element 111, may be absorbed by the heat-dissipating elastic body 120, thereby stably protecting the battery 10.

Meanwhile, when the second guide element 112 consists of a metallic material, a problem such as abrasion or damage caused by the contact between metals may be solved by disposing the heat-dissipating elastic body 120 even at the inner surface of the second guide element 112, and heat generated from the battery 10 may be actively transferred to the second guide element 112.

In addition, the elastic element 120 may be detachably connected to the inner surface of the first guide element 111. Therefore, when it is necessary to replace or repair the elastic element 120, it may be simply separated from the first guide element 111 and replaced, and is able to be fastened in an assembly process, which may increase work productivity.

Figure 2:
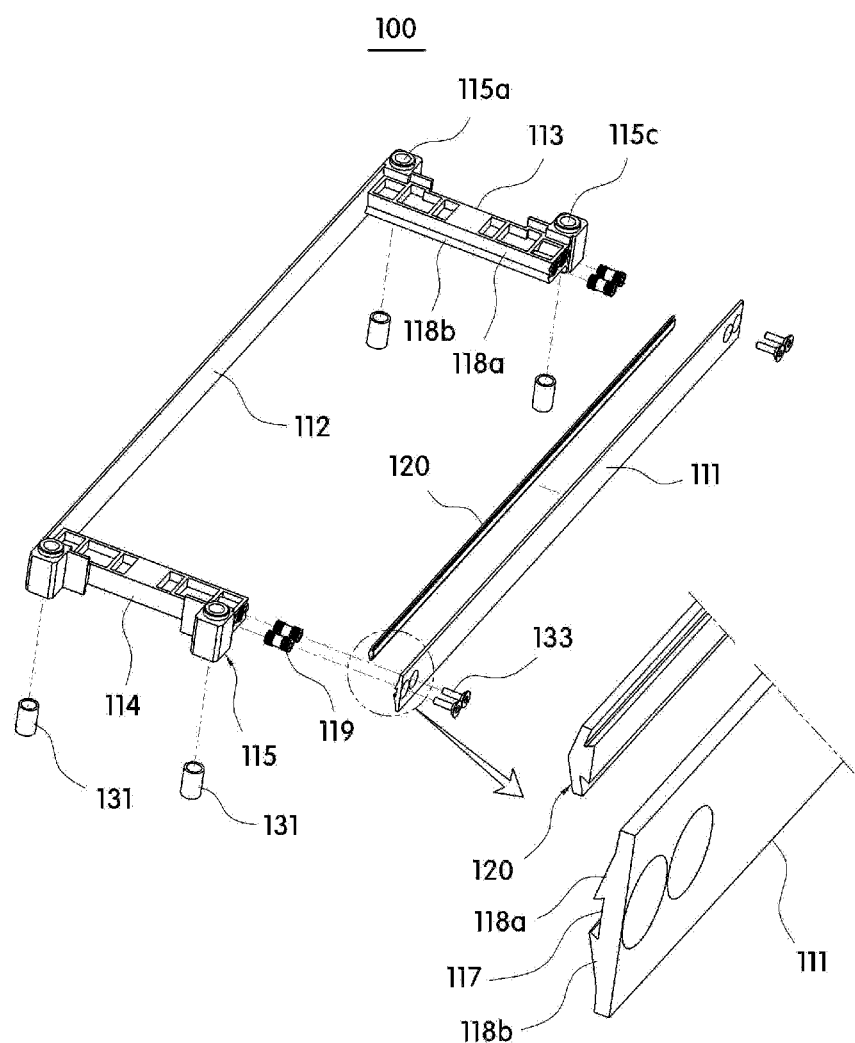
FIG. 2 is an exploded view of FIG. 1.

To this end, in the inner surface of the first guide element 111, a accommodating groove 117 may be inwardly formed along a longitudinal direction, and a partial thickness of the total thickness of the elastic element 120 may be insert-fitted into the accommodating groove 117 (see FIG. 2).

Therefore, the elastic element 120 may be inserted into the accommodating groove 117 to be coupled with the first guide element 111, and a part of the elastic element may be protruded from the inner surface of the first guide element 111, such that the edge of the battery 10 may be closely contacted.

Meanwhile, a displacement-preventing structure in which the accommodating groove 117 and the elastic element 120 fastened to the accommodating groove 117 at the side of the elastic element 120 correspond to each other to prevent easy displacement thereof may be formed. This is to prevent the separation of the elastic element 120 from the accommodating groove 117 regardless of the intention of a technician, when the plurality of batteries 10 and the heat-dissipating cartridges 100, 200 and 300 are laminated to implement a battery pack.

Figure 10:
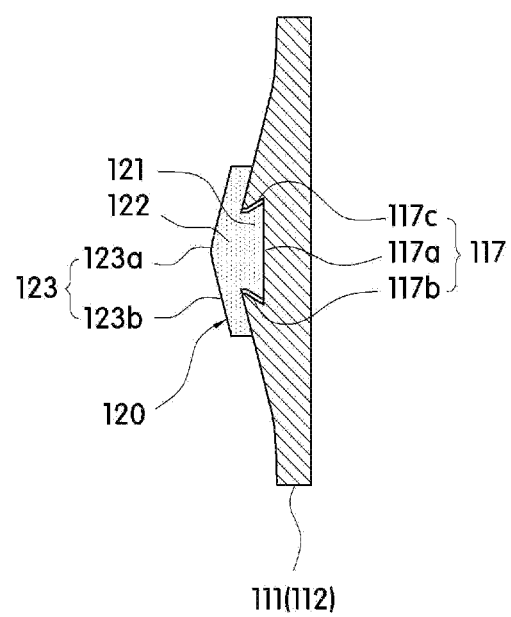
FIG. 10 is a cross-sectional view along with perpendicular to the longitudinal direction of the guide element 111 and 112 in FIG. 8.

To this end, in the accommodating groove 117, a pair of the side walls 117b and 117c opposite to each other may be inclined at a predetermined angle toward a bottom surface 117a thereof. In addition, the elastic element 120 may include a first portion 121 inserted into the accommodating groove 117 and a second portion 122 in contact with the edge of the battery 10, and a side surface of the first portion 121 and a side surface of the second portion 122 may be formed as a stepped surface (see FIGS. 3 and 10).

Accordingly, a predetermined space into which parts of the side walls 117b and 117c constituting the accommodating groove 117 are inserted using a stepped surface may be formed in the side surfaces of the elastic element 120 including a side surface of the first portion 121 and a side surface of the second portion 122, such that easy displacement of the first portion 121 inserted into the accommodating groove 117 may be prevented.

Here, the side surface of the first portion 121 may be formed to be inclined at the same angle with the side walls 117b and 117c inclined at a predetermined angle toward the bottom surface of the accommodating groove 117. In addition, one surface of the second portion 121 exposed to the outside while being fastened to the accommodating groove 117 may have a third inclined surface 123a and a fourth inclined surface 123b, which are inclined in opposite directions based on the width center like the inner surface of the first guide element 111. Here, the third inclined surface 123a is formed parallel to the first inclined surface 118a, and the fourth inclined surface 123b may be formed parallel to the second inclined surface 118b. Accordingly, as described above, when a battery pack is implemented by sequentially laminating a plurality of the heat-dissipating cartridges 100, 200 and 300, the battery 10 disposed in the accommodating space S may be accommodated at a partial thickness (preferably, a half of the total thickness) of the total thickness in the second accommodating space S2 formed in one located below among the two laminated heat-dissipating cartridges 100, 200 or 300, and the rest of the battery 10 may be accommodated in the first accommodating space S1 formed in the other located above among the heat-dissipating cartridges 100, 200 or 300. In the same manner as described above, a plurality of the batteries 10 may be accommodated between two adjacent heat-dissipating cartridges 100, 200 or 300.

Meanwhile, when the second guide element 112 consists of a metallic material, and the elastic element 120 is disposed on the inner surface, it is known that a method of connecting the second guide element 112 and the elastic element 120 may adopt the same method of connecting the first guide element 111 and the elastic element 120.

The third and fourth guide elements 113 and 114 are used to fix two terminals 12a and 12b which link the first and second guide elements 111 and 112 together, spaced apart from each other, and are withdrawn from the battery 10 disposed in the accommodating space S.

Here, the two terminals 12a and 12b withdrawn from the battery 10 may be formed to be located one by one at both ends of the battery body, and any one of the two terminals 12a and 12b may be fixed to the third guide element 113, and the other terminal may be fixed to the fourth guide element 114. In addition, the two terminals 12a and 12b may be fixed to the third and fourth guide elements 113 and 114 to cover surfaces except the inner surfaces of the third guide element 113 and the fourth guide element 114 (see FIG. 14).

Therefore, when a battery pack is implemented by laminating a plurality of batteries 10 and the heat-dissipating cartridges 100, 200 and 300, the terminals 12a and 12b withdrawn from each battery 10 may be located between adjacent third guide elements 113 and adjacent fourth guide elements 114, respectively, to directly contact each other and thus may be electrically connected to each other.

Here, the third guide element 113 and the fourth guide element 114 may consist of an insulator. These are used to prevent an electrical short by rendering electric flow only to the terminals 12a and 12b while the terminals 12a and 12b of the battery 10 are fixed.

To this end, the third guide element 113 and the fourth guide element 114 may consist of a polymer resin with electric insulation, and preferably, a thermoplastic polymer resin enabling injection molding. For example, the third guide element 113 and the fourth guide element 114 may consist of a thermoplastic polymer resin in which an insulating heat-dissipating filler such as BN, AlN, MgO $SiO_2$ or $Al_2O_3$ is dispersed.

Moreover, when the third guide element 113 and the fourth guide element 114 consist of a thermoplastic polymer resin enabling injection molding, at least one recess 116 inwardly formed to prevent deformation due to warping in injection molding may be formed, thereby forming a reinforcing rib L between adjacent recesses 116. Such recesses 116 may be formed symmetrically with respect to the middle portion of the length of the third guide element 113 and the fourth guide element 114, and symmetrically formed in the upper and lower surfaces, respectively, which are opposite to each other (see FIG. 1).

Meanwhile, when the third and fourth guide elements 113 and 114 are formed by laminating a plurality of the cartridges 100, 200 and 300 for a battery pack in one direction, connecting holes 115 for connecting two adjacent cartridges 100, 200 or 300 for a battery pack may be formed.

Accordingly, as two adjacent cartridges 100, 200 or 300 for a battery pack among a plurality of the laminated cartridges 100, 200 and 300 for a battery pack are sequentially connected, a plurality of the laminated cartridges 100, 200 and 300 for a battery pack may be integrated.

The connecting holes 115 may be formed in one side of the third and fourth guide elements 113 and 114 to have a predetermined height in the same direction as the direction of laminating the cartridges for a battery pack, and a protruding part 115a and a receiving part 115b, which correspond to each other, may be formed in both surfaces of the connecting hole 115, respectively.

Figure 5:
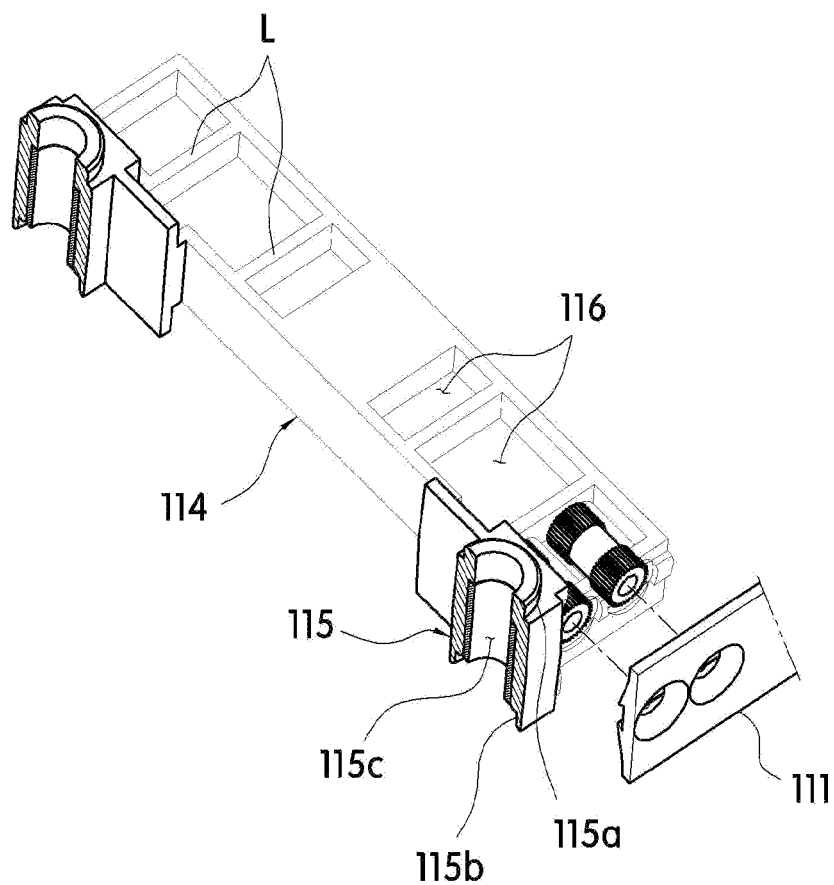
FIG. 5 is a diagram illustrating a fastening relationship between a first guide element and a fourth guide element in FIG. 1.

In one example, in the lower surface of the connecting hole 115, a receiving part 115b may be formed in the form of an indented accommodating groove, and in the upper surface of the connecting hole 115, the protruding part 115a protruded outwardly at a predetermined length may be formed (see FIG. 5).

Therefore, when a plurality of the cartridges 100, 200 and 300 for a battery pack are laminated, the protruding part 115a of the cartridge for a battery pack 100, 200 or 300 disposed on the lower side may be inserted into the receiving part 115b of the cartridge for a battery pack 100, 200 or 300 disposed on the upper side, such that the cartridges are fastened together. For this reason, during laminating, a plurality of the cartridges 100, 200 and 300 for a battery pack may be connected through simple insertion, thereby improving assembly productivity.

Here, the connecting holes 115 may include a through hole 115c formed through the protruding part 115a and the receiving part 115b, and when a plurality of the cartridges 100, 200 and 300 for a battery pack are laminated, the through hole 115c formed in each cartridge 100, 200 or 300 for a battery pack may communicate with each other.

Therefore, when a fastening bar 132 having a predetermined length is inserted into the through hole 115c, and fixing elements 134 such as nuts are fastened to both ends of the fastening bar 132, a plurality of the laminated cartridges 100, 200 and 300 for a battery pack may be integrated by means of the fastening bar 132, thereby preventing the separation of each cartridge 100, 200 or 300 for a battery pack from the laminate. Moreover, the laminated cartridges 100, 200 and 300 for a battery pack may be brought into close contact with each other using the fixing elements connected to both ends of the fastening bar 132, thereby increasing the contact strength between the terminals 12a and 12b withdrawn from each battery 10 (see FIGS. 12 to 14).

Here, damage to the connecting hole 115 due to an external force or excessive fastening strength may be prevented by inserting known bushings 131 into the through holes 115c through which the fastening bars 132 pass (see FIG. 2).

Meanwhile, in the heat-dissipating cartridge 100, 200 or 300 for a battery pack according to the present invention, a plurality of guide elements 111, 112, 113 and 114 which configure the main body 110, 210 or 310 may be integrated, or some of or all guide elements 111, 112, 113 and 114 may be assembled by a fastening method.

Figure 7:
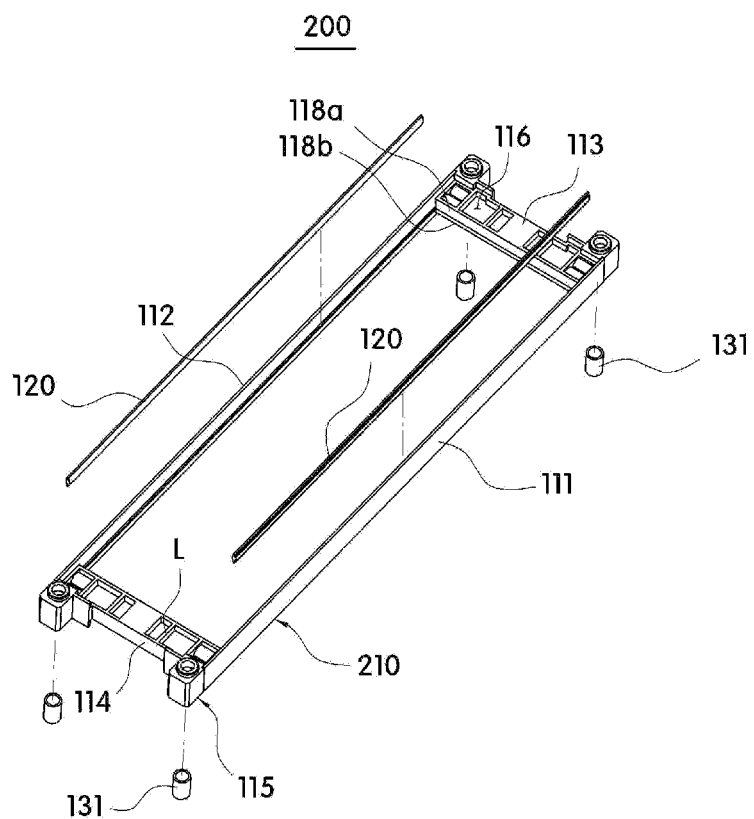
FIG. 7 is a diagram illustrating that a bushing in FIG. 6 is separated.

In one example, the main body 110 may be formed by integrating a plurality of the guide elements 111, 112, 113 and 114 through an insert molding method (see FIGS. 6 and 7). Specifically, when only the first guide element 111 consists of a metallic material, or both of the first guide element 111 and the second guide element 112 consist of a metallic material, while the guide element consisting of a metallic material is disposed in a mold, other guide elements may be formed through insert molding by injecting a polymer resin in which an insulating heat-dissipating filler is dispersed into the mold, thereby forming the main body 110 in an integral form.

In another example, in the heat-dissipating cartridge 100 for a battery pack according to the present invention, when the first guide element 111 consists of a metallic material, and the other guide elements 112, 113 and 114 consist of a non-metallic material, the main body 110 may be configured by detachably connecting the first guide element 111 to the other guide elements 112, 113 and 114, which are formed in an integral form (see FIGS. 1 and 2). Specifically, a protrusion in which the third and fourth guide elements 113 and 114 are integrally connected to both ends of the second guide element 112 is formed through insert molding using a polymer resin in which an insulating heat-dissipating filler is dispersed, and both ends of the first guide element 111 may be detachably connected to free terminals of the third and fourth guide elements 113 and 114, respectively, by means of fastening elements 133 such as bolts. Here, a nut 119 for fastening with the fastening element 133 may be buried at the free end sides of the third and fourth guide elements 113 and 114 during insert molding. In the exemplary embodiment, when the second guide element 112 consists of a metallic material, the second guide element 112 may be integrally formed with the third and fourth guide elements 113 and 114 through the above-described insert molding.

Figure 9:
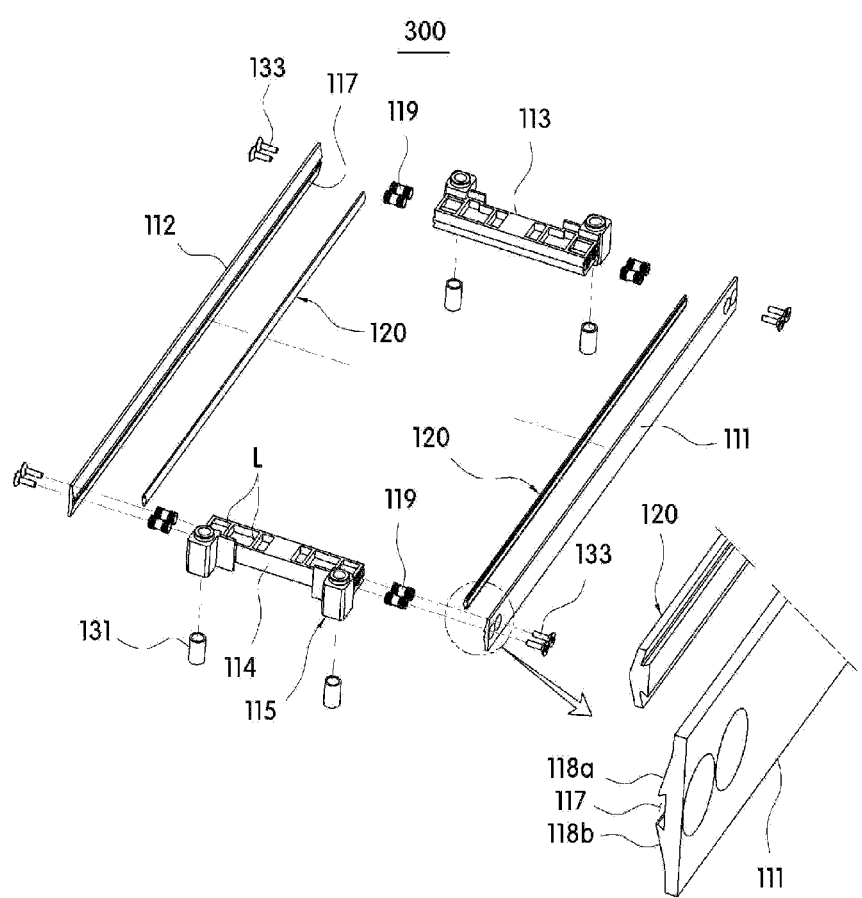
FIG. 9 is an exploded view of FIG. 8.

In still another example, in the heat-dissipating cartridge 300 for a battery pack according to the present invention, the main body 310 may be configured by connecting both ends of the first guide element 111 and the second guide element 112 to both ends of the third and fourth guide elements 113 and 114, respectively, by means of fastening elements 133 such as bolts (see FIGS. 8 and 9). To this end, in the heat-dissipating cartridge 300 for a battery pack according to the present invention, a plurality of the guide elements 111, 112, 113 and 114 and an elastic element 120 may be fastened to each other through an assembling method. In this case, at the both ends of the third and fourth guide elements 113 and 114, nuts 119 for fastening with fastening elements 133 may be buried. Here, a guide element consisting of a metallic material may be the first guide element 111, or the first guide element 111 and the second guide element 112, but the third and fourth guide elements 113 and 114 may be formed of an insulator for electric insulation with the terminals 12a and 12b of the battery 10.

EXAMPLES

The present invention will be described in further detail with reference to the following examples. However, the following examples should not be construed as limiting the scope of the present invention and should be construed as helping the understanding of the present invention.

Example 1

100 parts by weight of methyl vinyl silicone gum having a weight average molecular weight of 540,000 and a viscosity of 10,000,000 cps as a base resin was put into a kneader, and then 22 parts by weight of fumed silica having a specific surface area of 275 m$^2$/g and an average particle size of 12 nm as a filling-reinforcing agent, and 6.25 parts by weight of methyl vinyl silicone having a polymerization degree of 17 as a physical property-enhancing component were further added thereto, followed by kneading for 90 minutes. Afterward, 150 parts by weight of alumina having an average particle size of 8 μm was put into the kneader with respect to 100 parts by weight of the base resin and mixed. The resulting mixture was mixed in a 2-roll, and 0.31 part by weight of an organic peroxide, 2,5-dimethyl-2,5-di (t-butyl peroxy)hexane, as a vulcanizing agent was added with respect to 100 parts by weight of the base resin, and then mixed and defoamed, thereby preparing a heat-dissipating elastic body composition having a viscosity of 8,200,000 cps at 25° C.

Subsequently, the prepared composition may be put into a press mold and subjected to first vulcanization by applying heat at 160° C. and a pressure of 50 kgf/cm$^2$ for 6 minutes, and then to completely remove a unreacted vulcanizing agent of the molded product, second vulcanization was performed at 210° C. for 2 hours, thereby preparing a heat-dissipating elastic body having a size of 2 cm×2 cm×2 cm (width×length×height) as shown in Table 1.

Examples 2 to 3

A heat-dissipating elastic body was prepared as shown in Table 1 below in the same manner as described in Example 1, except that the composition of a heat-dissipating elastic body composition was changed as shown in Table 1 below.

Comparative Example 1 and 2

A heat-dissipating elastic body was prepared as shown in Table 1 below in the same manner as described in Example 1, except that the composition of a heat-dissipating elastic body composition was changed as shown in Table 1 below.

Experimental Example 1

Physical properties of the heat-dissipating elastic bodies prepared in Examples 1 to 3 and Comparative Examples 1 and 2 were evaluated and shown in Table 1 below.

First, thermal conductivity was measured by a method according to ASTM E 1461. In addition, hardness was measured using a hardness tester (Shore-A). In addition, a tensile strength and an elongation rate were measured using a universal testing machine (UTM).

TABLE 1

|  |  | Example 1 | Example 2 | Example 3 | Comparative Example 1 | Comparative Example 2 |
|---|---|---|---|---|---|---|
| Heat-dissipating elastic body composition | Heat-dissipating filler (parts by weight) | 150 | 225 | 300 | 130 | 320 |
| Heat-dissipating elastic body | Thermal conductivity (W/m · k) | 0.7 | 1.0 | 1.3 | 0.4 | 1.4 |
|  | Shore A | 55 | 60 | 70 | 40 | 80 |
|  | Tensile strength (kgf/cm$^2$) | 59 | 53 | 45 | 62 | 33 |
|  | Elongation (%) | 145 | 105 | 75 | 160 | 51 |

As shown in Table 1, it can be confirmed that Examples 1 to 3 are superior in thermal conductivity, hardness, tensile strength and an elongation rate, compared with Comparative Examples 1 and 2 in which a heat-dissipating filler was included at a content outside the content range according to the present invention. Particularly, in the case of Comparative Example 1, although hardness, tensile strength and an elongation rate, except thermal conductivity, were somewhat superior, compared with Example 1, it can be confirmed that the decrease in thermal conductivity is significantly greater than the increase in the other physical properties.

Examples 4 to 9

A heat-dissipating elastic body having a size of 20 cm×20 cm×3 cm (width×length×height) was prepared in the same manner as described in Example 1, except that the composition of a heat-dissipating elastic body was changed.

Experimental Example 2

Physical properties of the heat-dissipating elastic bodys prepared in Examples 4 to 9 were evaluated and shown in Table 2 below.

First, for the thermal conduction uniformity, a specimen was placed in a chamber having an inner temperature of 25° C., and a 20 W ceramic heat source having a diameter of 2 cm was placed at the lower surface of the center of the specimen. Afterward, initial temperatures of four spots spaced 15 cm apart from each other were measured from the center of the upper surface of the specimen to a side wall, power was applied to the ceramic heat source, and then the time for increasing a temperature by 10° C. at each spot was measured in seconds. The standard deviation for the time measured at the four spots was calculated, and as the resulting standard deviation is smaller, the more uniform the heat dissipating characteristic is.

Subsequently, for shape retention, after the specimen was placed in a chamber, a predetermined pressure was applied from the upper surface of the specimen so that the specimen had a thickness of 1 cm, and a temperature of the chamber was adjusted to 100° C. Afterward, after 50 hours, the specimen was taken from the chamber, and while the pressure was released, the specimen was left at room temperature of 25° C. for 1 hour. And then, the thickness of the specimen was measured again, and the final thickness was expressed as a percentage with the initial thickness taken as 100%.

TABLE 2

|  |  | Example 4 | Example 5 | Example 6 | Example 7 | Example 8 | Example 9 |
|---|---|---|---|---|---|---|---|
| Heat-dissipating elastic body composition | Physical property-enhancing component (type/polymerization degree/content) | A/17/6.25 | A/17/9.7 | A/17/11.2 | A/17/3.3 | A/17/2.5 | A/28/6.25 |
| Heat-dissipating elastic body | Thermal conduction uniformity (sec) | 0.15 | 0.12 | 0.11 | 0.19 | 0.24 | 0.17 |
|  | Shape retention (%) | 96 | 93 | 86 | 98 | 98 | 88 |

* A represents methyl vinyl silicone.

As shown in Table 2, it can be confirmed that Examples 4, 5 and 7 in which the content of a physical property-enhancing component was within the preferable range of the present invention are more suitable for simultaneously achieving the thermal conduction uniformity and shape retention than Examples 5 and 8 in which the content of a physical property-enhancing component was outside the above-described range.

Examples 10 to 21

Heat-dissipating elastic bodys having a size of 15 cm×15 cm×5 cm (width×length×height) were prepared in the same manner as described in Example 1. Although the sum of the weights of a first heat-dissipating filler and a second heat-dissipating filler, which had different particle sizes, was the same as that in Example 1, the particle sizes and contents of the first heat-dissipating filler and the second heat-dissipating filler were changed as shown in Table 3 below. Here, the weight ratio of the second heat-dissipating filler shown in Table 3 below is based on 100 parts by weight of the first heat-dissipating filler.

Experimental Example 3

Physical properties of the heat-dissipating elastic bodies prepared in Examples 10 to 21 were evaluated and shown in Table 3 below.

First, thermal conductivity was measured by the method of Experimental Example 2, and after power was applied, a temperature was measured at the four vertices of the upper surface of the specimen after 20 minutes, thereby calculating an average value. Here, the average value of Examples 11 to 21 was relatively expressed based on the average value of Example 10 as 100.

Subsequently, to evaluate thermal conduction uniformity, a process was performed in the same manner as described in Experimental Example 2, the time for increasing a temperature by 10° C. was measured at four spots spaced 10 cm apart from the center of the upper surface in seconds, and the standard deviation of the measured time for the four spots was calculated.

TABLE 3

|  |  | Example 10 | Example 11 | Example 12 | Example 13 | Example 14 | Example 15 | Example 16 | Example 17 |
|---|---|---|---|---|---|---|---|---|---|
| Heat-dissipating elastic body composition | First heat-dissipating filler (average particle size (μm)/parts by weight) | 8/100 | 8/100 | 8/100 | 8/100 | 8/100 | 8/100 | 8/100 | 8/100 |
|  | Second heat-dissipating filler (average particle size (μm)/parts by weight) | Not included | 11/155 | 12.5/155 | 20/155 | 29/155 | 45/155 | 55/155 | 12.5/140 |
| Heat-dissipating elastic body | Thermal conductivity (%) | 100 | 110 | 110 | 112 | 113 | 111 | 110 | 106 |
|  | Thermal conduction uniformity (sec) | 0.20 | 0.16 | 0.11 | 0.08 | 0.12 | 0.12 | 0.15 | 0.12 |

TABLE 4

|  |  | Example 18 | Example 19 | Example 20 | Example 21 |
|---|---|---|---|---|---|
| Heat-dissipating elastic body composition | First heat-dissipating filler (average particle size (μm)/parts by weight) | 8/100 | 8/100 | 8/100 | — |
|  | Second heat-dissipating filler (average particle size (μm)/parts by weight) | 12.5/300 | 12.5/480 | 12.5/550 | 30.3/100 |
| Heat-dissipating elastic body | Thermal conductivity (%) | 123 | 130 | 132 | 118 |
|  | Thermal conduction uniformity (sec) | 0.14 | 0.16 | 0.22 | 0.32 |

As shown in Tables 3 and 4, it can be confirmed that both specimens in Examples 10 and 21 which included only one type of heat-dissipating filler having a predetermined average particle size are very poor in terms of thermal conduction uniformity.

Contrarily, it can be confirmed that Examples 11 to 19 are superior to Examples 10 and 21 in terms of thermal conduction uniformity.

Although exemplary embodiments of the present invention have been described above, the spirit of the present invention is not limited to the exemplary embodiments presented herein, and it will be understood by those of ordinary skill in the art that other exemplary embodiments may be easily suggested by adding, changing, deleting or adding components within the scope of the same idea and also included in the scope of the spirit of the present invention.

The invention claimed is:

1. A heat-dissipating elastic body composition, comprising:
- an elastic matrix-forming component including a vulcanizing agent and a base resin containing a raw silicone rubber;
- 140 to 300 parts by weight of a heat-dissipating filler with respect to 100 parts by weight of the elastic matrix-forming component, and
- 3 to 10 parts by weight of a physical property-enhancing component for improving plasticity and dispersity of the heat-dissipating filler with respect to 100 parts by weight of the base resin,
- wherein the physical property-enhancing component is methyl vinyl silicone having a polymerization degree of 15 to 25 and in which hydroxyl groups are present at both ends.

2. The composition according to claim 1, wherein the raw silicone rubber includes one or more raw silicone rubbers selected from the group consisting of dimethyl silicone gum, methylphenyl silicone gum, fluorine silicone gum, hydroxyl dimethyl silicone gum and methyl vinyl silicone gum, and
- the vulcanizing agent includes any one of a sulfur-based vulcanizing agent, an organic peroxide and a metal oxide.

3. The composition according to claim 1, wherein the heat-dissipating filler includes any one or more of an electrically non-conductive heat-dissipating filler including one or more selected from the group consisting of magnesium oxide, magnesium hydroxide, titanium dioxide, aluminum nitride, silicon nitride, boron nitride, aluminum oxide, aluminum hydroxide, silica, zinc oxide, barium titanate, strontium titanate, beryllium oxide, silicon carbide and manganese oxide; and
- an electrically conductive heat-dissipating filler including one or more selected from the group consisting of graphite, a carbon nanotube, graphene, carbon black, electrically conductive carbon, silver, copper, nickel, tin, aluminum, zinc, iron, gold and platinum.

4. The composition according to claim 1, wherein the raw silicone rubber has a weight average molecular weight of 500,000 to 600,000.

5. The composition according to claim 1, further comprising:
- 20 to 40 parts by weight of one or more filling-reinforcing agents selected from the group consisting of fumed silica, precipitated silica, quartz, Celite and calcium carbonate with respect to 100 parts by weight of the base resin.

6. The composition according to claim 1, wherein the heat-dissipating filler includes 150 to 500 parts by weight of a second heat-dissipating filler having an average particle size of more than 10 to 50 μm with respect to 100 parts by weight of a first heat-dissipating filler having an average particle size of 1 to 10 μm.

7. The composition according to claim 1, wherein the vulcanizing agent is included at 0.1 to 5 parts by weight with respect to 100 parts by weight of the base resin.

8. The composition according to claim 1, wherein the heat-dissipating elastic body composition has a viscosity of 7,000,000 to 10,000,000 cPs at 25° C.

9. A method of manufacturing a heat-dissipating elastic body, comprising:
- (1) preparing the heat-dissipating elastic body composition of claim 1; and
- (2) molding the heat-dissipating elastic body composition into a predetermined shape by applying heat and pressure thereto.

10. The method according to claim 9, wherein the step (1) comprises:
- 1-1) preparing a pre-foam composition kneaded by further adding a filling-reinforcing agent and the physical property-enhancing component to the base resin; and
- 1-2) adding the heat-dissipating filler to the pre-foam composition and kneading the resulting mixture; and
- 1-3) preparing the heat-dissipating elastic body composition by adding and kneading the vulcanizing agent.

11. The method according to claim 9, wherein the step (2) is performed by applying 150 to 250° C. heat and a pressure of 30 to 80 kgf/cm² for 3 to 30 minutes.

12. The method according to claim 9, wherein, after the step (2), at 200 to 300° C. heat is retreated for 1 to 4 hours to eliminate an unreacted vulcanizing agent.

13. A heat-dissipating elastic body which is formed by molding the heat-dissipating elastic body composition according to claim 1.

14. The heat-dissipating elastic body according to claim 13, which has a thermal conductivity of 0.5 to 3.0 W/m·K.

15. The heat-dissipating elastic body according to claim 13, which has a tensile strength of 35 to 65 kgf/cm², an elongation rate of 65 to 180%, and a hardness (Shore A) of 45 to 75.

16. A heat-dissipating cartridge for a battery pack which supports an edge of a battery to configure the battery pack, comprising:
- a main body including a pair of first and second guide elements spaced apart from each other to face each other and a pair of third and fourth guide elements spaced apart from each other between the first and second guide elements to face each other to fix terminals of the battery and form an accommodating space accommodating the battery; and
- an elastic element formed by molding the heat-dissipating elastic body composition of claim 1, and detachably connected to at least any one inner surface of the first and second guide elements,
- wherein at least any one of the first and second guide elements consists of a metallic material.

17. The cartridge according to claim 16, wherein at least any one inner surface of the first and second guide elements has an accommodating groove inwardly formed along a longitudinal direction, and the elastic element is insert-fitted into the accommodating groove.

18. The cartridge according to claim 17, wherein the accommodating groove includes a pair of side walls facing each other, and the pair of side walls are inclined at a predetermined angle in opposite directions relative to the bottom surface of the accommodating groove.

* * * * *